United States Patent
Harter

[15] 3,682,418
[45] Aug. 8, 1972

[54] AERIAL SPRAYING DEVICE

[72] Inventor: Charles G. Harter, Lihue, Hawaii

[73] Assignee: Garden Island Helicopters, Inc., Lihue, Kauai, Hawaii

[22] Filed: Oct. 29, 1970

[21] Appl. No.: 85,062

[52] U.S. Cl. ............................................. 244/136
[51] Int. Cl. .............................................. B64d 1/16
[58] Field of Search ........................... 244/136, 135 A

[56] References Cited

UNITED STATES PATENTS

| | | | |
|---|---|---|---|
| 3,084,890 | 4/1963 | Hyde | 244/136 |
| 3,362,289 | 1/1968 | Guin | 244/136 X |
| 2,967,684 | 1/1961 | Knecht | 244/136 |

*Primary Examiner*—Milton Buchler
*Assistant Examiner*—Gregory W. O'Connor
*Attorney*—Townsend & Townsend

[57] ABSTRACT

An apparatus and method for aerially spraying with agricultural chemicals narrow strips of weeds such as those found between rows of sugar cane and infield irrigation ditches. The apparatus is a stiff, elongated boom-like conduit utilized in cooperation with a helicopter. The former is mounted ventrally and forwardly of the helicopter on a pivot. The latter is equipped with a winch and frame for lowering and raising the boom on cables, as well as with a spray tank and pump for providing herbicide to a spray nozzle or nozzles attached at the outboard end of the boom. Lowering of the conduit enables a pilot to reach irrigation ditches between tall rows of sugar cane and destroy narrow strips of weeds with a minimum amount of spray and without harming the cane.

8 Claims, 5 Drawing Figures

PATENTED AUG 8 1972 3,682,418

INVENTOR.
CHARLES G. HARTER
BY
ATTORNEYS

INVENTOR.
CHARLES G. HARTER
BY
ATTORNEYS

AERIAL SPRAYING DEVICE

GENERAL DESCRIPTION

The preferred embodiment of the invention shown in the drawings and described hereinafter singly and in combination comprises at least one stiff elongate conduit depending from and in vertical pivotal relationship to a transverse cross member mounted ventrally of a helicopter fusilage, said conduit having an outboard spray nozzle or nozzles fed by a pump and tank mounted medially of such helicopter. Said conduit may be raised or lowered by a winch mounted interiorly of the cabin, to which is attached cables running through a pulley on a brace mounted forwardly of the helicopter skids, the extremity of such cables being secured to the conduit.

It has been the custom and practice in the spraying of infield irrigation ditches either to spray them manually, or cover both the ditches and surrounding sugar cane with a wide swath of herbicide. The former method is disadvantageous because of the extreme cost, the latter because of wastage of herbicide and damage to specialty crops such as sugar cane.

Therefore it is an object of this invention to provide an aerial spraying device which covers isolated strips of weed growth with herbicide yet is easily maneuverable between rows of tall crops such as sugar cane.

Another object of this invention is to provide an aerial sprayer which eliminates narrow strips of weeds with maximum efficiency yet with minimum use of herbicide, thus avoiding lateralization of the soil.

Still another object of this invention is to avoid damage to specialty crops such as sugar cane, by keeping their leaves free from herbicide yet at the same time destroying strips of weeds in between them.

An additional object of this invention is to allow a single pilot to fly the helicopter, raise and lower the boom, and control the emission of herbicide simultaneously.

Yet another object of this invention is to keep the spraying device in constant view of the pilot yet away from the downwash of the rotorblast from the helicopter.

A further object of this device is to provide fast retraction of the boom to facilitate the multiple landings necessary in loading herbicide.

A further object of this invention is to provide a safe aerial spraying device by designing the conduit as collapsible should an object be encountered in flight or during landing.

IN THE DRAWINGS

The objects, features and advantages of the present invention will be more apparent after referring to the following specification and accompanying drawings in which.

Figure 1:
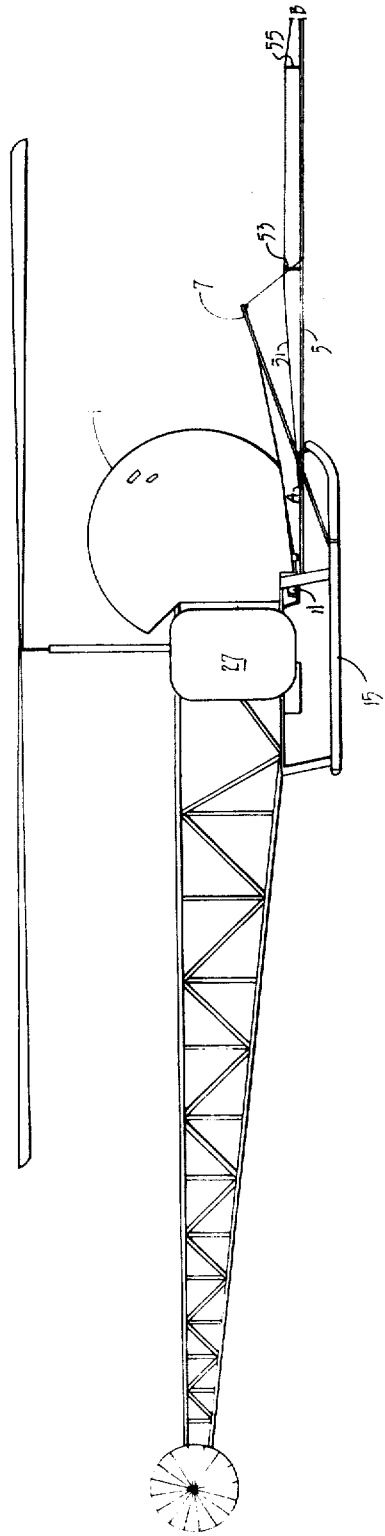
FIG. 1 is a side elevation showing a helicopter and attached conduits.
Figure 5:
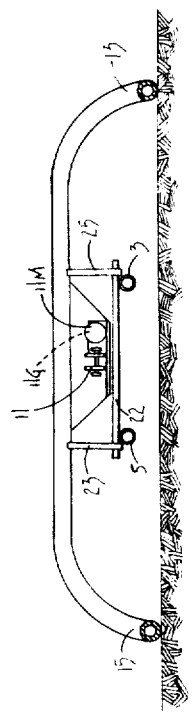
FIG. 5 is a frontal view of the skids, pivot shaft, bracket, and winch.
Figure 2:
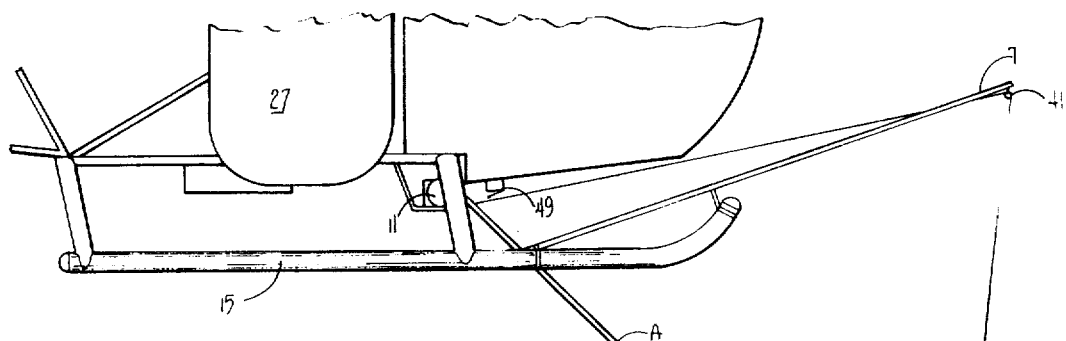
FIG. 2 is a side elevation view of the conduits shown in Fig. 1 at an enlarged scale so as to particularly depict the cables and brace.
Figure 3:
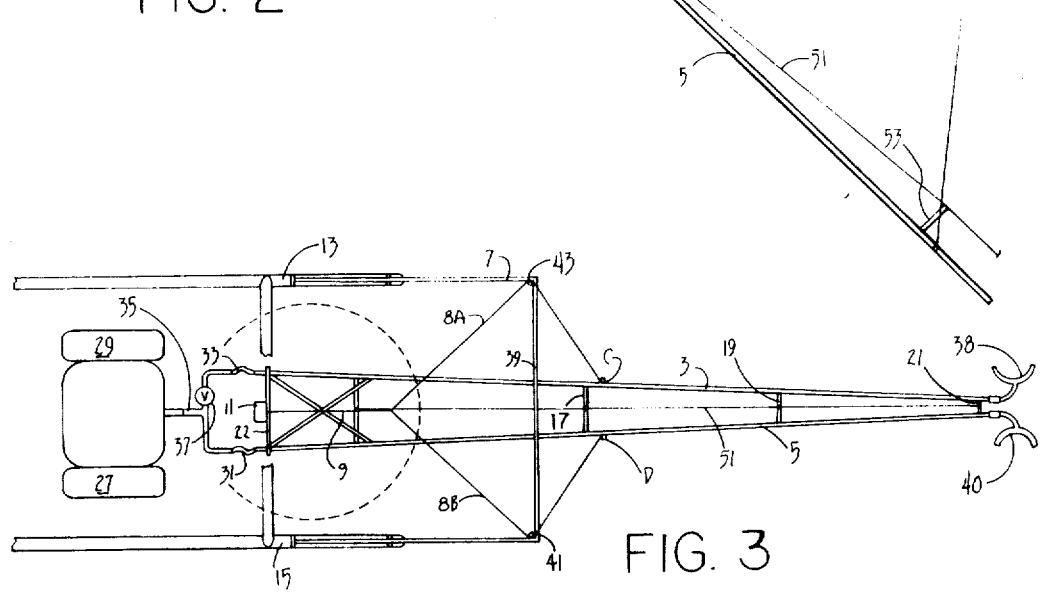
FIG. 3 is a plan view of tanks, conduits, brace, and supporting structures.

The embodiment of the invention hereinafter described generally includes a helicopter 1 in combination with downwardly depending stiff elongated conduits 3 and 5, suspended from brace 7 by means of cable 9 running to winch 11. Brace 7 is mounted forwardly of helicopter 1 on skids 13 and 15, while conduits 3 and 5 are joined medially by transverse shafts 17, 19, and 21. Conduits 3 and 5 are mounted pivotally on pivot shaft 22, which is suspended by brackets 23 and 25. Brackets 23 and 25 are mounted at the juncture of skids 13 and 15. Herbicide or insecticide is pumped from tanks 27 and 29 through hoses 31 and 33 by pump 35 to conduits 3 and 5 and thence to spray nozzles 38 and 40, conventional elements which function to distribute the agricultural chemicals in an appropriate pattern. Flow from tanks 27, 29 may be cut off from conduit 3 by solenoid valve 37, thus concentrating the flow from tanks 27, 29 to conduit 3. Frame 7 is equipped with transverse bar 39 with pulleys 41 and 43 attached to its extremities, through which cable 9 is drawn by winch 11. Operationally, transverse bar 39 is mounted above pivot shaft 22, while pivot shaft 22 is mounted above skids 13 and 15 so that when conduits 3 and 5 are elevated to a horizontal position by winch 11 they rise above the bottom of the skids and consequently clear the ground surface. Lateral stability is afforded by equilateral cable runs 8A and 8B, proceeding from single cable 9 and affixed to points C and D on the twin conduits. A single cable 9 is released or retracted. Cable runs 8A, 8B are shortened or lengthened proportionately, and thus points C and D on the twin conduits are at all times equidistant from pulleys 43, 41. Winch 11 is operated electronically from within the cabin of helicopter 1. When conduits 3, 5 are elevated to a substantially horizontal position, stiff conduit 3 comes in contact with microswitch 49 mounted on the ventral surface of the helicopter, thus cutting off electrical power to the winch and causing cessation of movement of the conduits. The cable 51 is strung over members 52 and 55 and secured at points A and B on the spraying device to provide support as against the pull of gravity on the twin conduits. Yet, should the craft strike an object while in flight, cable 51 in no manner impedes the collapsibility of the twin conduits.

Figure 4:
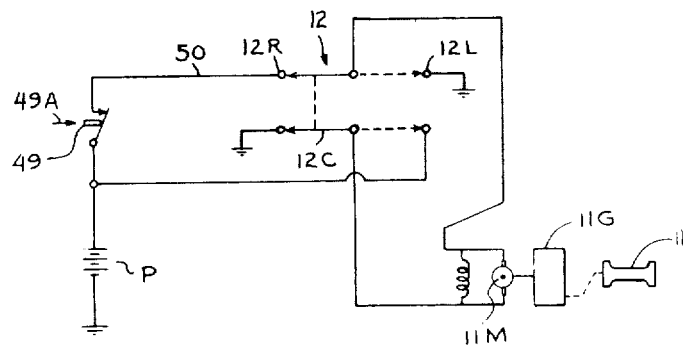
FIG. 4 is a schematic of the electrical circuitry and microswitch incident the winch.

Microswitch 49 is included in the electrical circuit that provides power from a power source P to a motor 11M, which drives winch 11 through suitable gear train 11G. Included in the circuit is a three-position boom control switch 12, which has a neutral position, a boom raising position and a boom lowering position. The boom control switch is physically located within the helicopter cabin for access by the pilot and is electrically connected as shown in Fig. 4. The switch includes paired movable contacts 12C that are switchable between a boom raising position at which they contact fixed contacts 12R shown in solid lines in Fig 4 and to a boom lowering position at which they contact fixed contacts 12L shown in broken lines in the figure. Microswitch 49 is connected in series with a conductor 50 that is active to carry current from power source P to motor 11M when switch R is in the boom raising position. The electrical contacts of microswitch 49 are normally closed so that power is supplied to the motor through conductor 50 until the boom formed by conduits 3 and 5 reaches a generally horizontal position as shown in Fig. 1. At such position, the boom engages the actuator of switch 49 and applies a force in the direction of arrow 49A thereby opening the contacts of the switch and interrupting power t motor 11M. Consequently, upward movement of the boom terminates.

Thus, it will be seen that the present invention provides a boom for attaching to an aerial craft that is relatively uncomplicated and light in weight, adjustable and stable during normal conditions of use. Of most importance is that the invention provides a structure that affords extremely accurate placement of agricultural chemicals to restricted areas.

While one embodiment of the invention has been shown and described, it will be obvious that other adaptations and modifications can be made without departing from the true spirit and scope of the invention.

What is claimed is:

1. In combination with an aerial craft, a unit for spraying agricultural chemicals, comprising at least one stiff, elongated conduit mounted forwardly of and in parallel alignment with the fuselage of an aerial craft, means disposed at the outboard extremity of said conduit for distributing the chemicals, means for attaching the inboard extremity of said conduit to an aerial craft, said attaching means allowing substantial vertical pivotal movement of the conduit up and down with relation to the aerial craft, means effecting said vertical movement with relation to the aerial craft, means supporting said last mentioned means fixedly extending forwardly of said aerial craftsaid movement effecting means being adapted to allow elevation of the conduit upon contact with the ground, means for controlling flow of the agricultural chemicals to said conduit.

2. The invention of claim 1 in combination with another stiff elongated conduit joined in substantially parallel alignment to said one stiff elongated conduit.

3. The invention of claim 2 wherein said flow controlling means comprises a single solenoid valve for concentrating flow to a single one of said conduits.

4. The invention of claim 1 i which said conduit attaching means comprises a pivot shaft mounted ventrally of an aerial craft.

5. The invention of claim 1 in which said distributing means disposed at the outboard extremity of said conduit comprises a spray nozzle.

6. A unit for spraying agricultural chemicals, comprising a least one stiff elongated conduit, means disposed at the outboard extremity of said conduit for distributing the chemicals means for attaching the inboard extremity of said conduit to an aerial craft, said attaching means allowing substantially vertical pivotal movement of the conduit up and down with relation to the aerial craft, means effecting said vertical movement with relation to the aerial craft, said movement effecting means being adapted to allow elevation of the conduit upon contact with the ground, means for controlling flow of the agricultural chemicals to said conduit and stabilizing means affording lateral stability to the conduits, said stabilizing means comprising a rigid frame mounted above the landing gear but below the fuselage of the aerial craft, said frame having right and left portions disposed outwardly on respective sides of the center line of the fuselage cable, more than one guide attached to said respective portions, right and left cable runs running through respective said guides, said cable runs having lower ends attached to said conduits, and upper ends connected together at a point, a single cable having a first end connected to said point and means attached to the aerial craft for taking up and paying out said run.

7. The invention of claim 6 wherein said cable taking up and paying out means comprises a winch for receiving therearound a single cable run, a motor for rotatably driving said winch, an electric circuit for energizing said motor and having a conductor active only when said motor is energized to take up said single run, a switch having normally closed contacts in series with said conductor, said switch having an actuating arm being disposed on the ventral surface of the aerial craft in the path of movement of said conduit so that the motor circuit is opened when the conduit reaches an upper position.

8. A unit for spraying agricultural chemicals, comprising at least one stiff elongated conduit, means disposed at the outboard extremity of said conduit for distributing the chemicals, means for attaching the inboard extremity of said conduit to an aerial craft, said attaching means allowing substantially vertical pivotal movement of the conduit up and down with relation to the aerial craft, means effecting said vertical movement of the conduit up and down with relation to the aerial craft, said movement effecting means being adapted to allow elevation of the conduit upon contact with the ground, means for controlling flow of the agricultural chemicals to said conduit, said spraying unit including: reinforcing means permitting collapse of the boom on accidental impact yet maintaining rigidity of the conduit, said reinforcing means comprising a cable attached to either end of said conduit, braces mounted medially of and perpendicular to said conduit, said braces tensioning said cable and spacing it from said conduit, while mounted on the top side thereof.

* * * * *